(12) United States Patent
Zink

(10) Patent No.: US 11,028,745 B2
(45) Date of Patent: Jun. 8, 2021

(54) METHOD FOR REGENERATING A PARTICLE FILTER

(71) Applicant: Volkswagen Aktiengesellschaft, Wolfsburg (DE)

(72) Inventor: Florian Zink, Bad Rappenau (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 89 days.

(21) Appl. No.: 16/322,221

(22) PCT Filed: Aug. 2, 2017

(86) PCT No.: PCT/EP2017/069518
§ 371 (c)(1),
(2) Date: Apr. 2, 2019

(87) PCT Pub. No.: WO2018/024768
PCT Pub. Date: Feb. 8, 2018

(65) Prior Publication Data
US 2019/0309669 A1 Oct. 10, 2019

(30) Foreign Application Priority Data
Aug. 4, 2016 (DE) ...................... 10 2016 114 427.4

(51) Int. Cl.
*F01N 3/023* (2006.01)
*F01N 9/00* (2006.01)

(52) U.S. Cl.
CPC ............. *F01N 3/023* (2013.01); *F01N 9/002* (2013.01); *F01N 2430/06* (2013.01);
(Continued)

(58) Field of Classification Search
CPC ............. F01N 2430/06; F01N 2900/08; F01N 2900/1404; F01N 2900/1606; F01N 3/023; F01N 9/002; Y02T 10/47
See application file for complete search history.

(56) References Cited

U.S. PATENT DOCUMENTS

| 2005/0198944 A1 | 9/2005 | Saitoh et al. |
| 2008/0010971 A1 | 1/2008 | Gioannini et al. |

(Continued)

FOREIGN PATENT DOCUMENTS

| CN | 101205823 A | 6/2008 |
| CN | 101676530 A | 3/2010 |

(Continued)

OTHER PUBLICATIONS

International Search Report of PCT Application No. PCT/EP2017/069518, dated Oct. 11, 2017.

(Continued)

*Primary Examiner* — Anthony Ayala Delgado
(74) *Attorney, Agent, or Firm* — Pearl Cohen Zedek Latzer Baratz LLP

(57) ABSTRACT

The invention relates to a method for regenerating a particle filter in an exhaust system of an internal combustion engine, comprising at least the following steps: a) performing a first regeneration of the particle filter until a lower threshold value of a particle load of the particle filter is reached; b) performing a verification measurement, wherein the internal combustion engine is operated at a first operating point such that an exhaust gas having at least—an excess of oxygen or—an elevated first temperature is provided upstream of the particle filter; wherein, if an increase of a second temperature is detected downstream of the particle filter during or after step b), c) a second regeneration of the particle filter is initiated.

8 Claims, 2 Drawing Sheets

(52) U.S. Cl.
CPC .. *F01N 2900/08* (2013.01); *F01N 2900/1404* (2013.01); *F01N 2900/1606* (2013.01); *Y02T 10/40* (2013.01)

(56) References Cited

U.S. PATENT DOCUMENTS

| | | | |
|---|---|---|---|
| 2009/0188241 A1* | 7/2009 | Sugiarto | F01N 9/002 60/295 |
| 2010/0041543 A1 | 2/2010 | Doering | |
| 2013/0213010 A1* | 8/2013 | Zhang | F01N 3/035 60/274 |
| 2016/0265413 A1* | 9/2016 | Willimowski | F01N 11/005 |

FOREIGN PATENT DOCUMENTS

| | | |
|---|---|---|
| DE | 199 45 372 A1 | 3/2001 |
| DE | 10 2005 011419 A1 | 9/2005 |
| DE | 10 2004 000065 A1 | 6/2006 |
| EP | 1425498 A1 | 6/2004 |
| EP | 1 873 369 A1 | 1/2008 |
| WO | WO/03025355 A1 | 3/2003 |

OTHER PUBLICATIONS

Office Action for Chinese Patent Application No. 201780047422.6, dated Jun. 3, 2020.

* cited by examiner

METHOD FOR REGENERATING A PARTICLE FILTER

CROSS-REFERENCE TO RELATED APPLICATIONS

This application is a National Phase Application of PCT International Application No. PCT/EP2017/069518, International Filing Date Aug. 2, 2017, claiming priority of German Patent Application No. 10 2016 114 427.4, filed Aug. 4, 2016, which is hereby incorporated by reference.

FIELD OF THE INVENTION

The present invention relates to a method for regenerating a particle filter, which is located in particular in an exhaust system of a combustion engine.

BACKGROUND OF THE INVENTION

Particle filters are used in the exhaust systems of combustion engines. The purpose of particle filters is to remove particles from the exhaust-gas stream and at least temporarily retain them. Specifically, particle filters are repeatedly cleaned, for example, by burning off the particles (for example, soot) stored, respectively deposited therein.

This process, commonly known as regeneration, is accomplished by increasing the exhaust-gas temperature and/or by increasing the oxygen concentration in the exhaust gas upstream of the particle filter. However, it is necessary to thereby monitor the temperature profile during the regeneration, since, otherwise, the particle filter can be damaged.

A regeneration method is known, for example, from the German Patent Application DE 10 2004 000 065 A1. It provides for modeling the regeneration process; the temperature, temperature gradient, particle count and burn rate within the particle filter being considered in the modeling. It is intended that the modeling control and regulate the oxygen concentration, mass flow and temperature of the exhaust gas, making a (local) burn rate of the particles controllable. The intention is to thus prevent a temperature or a temperature gradient from being exceeded, respectively fallen short of within the particle filter.

The known regeneration methods require highly complex equipment for the exhaust system and/or, in dependence upon the actual conditions in the exhaust system, lead less than adequately to regeneration, respectively to an increased fuel consumption.

SUMMARY OF THE INVENTION

It is an object of the present invention to at least alleviate the problems described with reference to the related art. In particular, it is intended to provide another method for regenerating a particle filter that will make it possible to check the success of a regeneration measure. It is also intended to effectively prevent the particle filter from overheating. It should be possible to implement the method with little outlay for equipment.

A method having the features set forth in claim 1 contributes to the achievement of these objectives. Advantageous embodiments constitute the subject matter of the dependent claims. The features specified in the claims may be combined with one another in a technologically useful way and be supplemented by illustrative subject matter from the specification and/or by the details pertaining to the figures; further variants of the present invention being presented.

A method for regenerating a particle filter in an exhaust system of a combustion engine is provided, including the following steps:

a) performing a first regeneration of the particle filter until a (predetermined) lower limit value of a particle loading of the particle filter is reached;

b) performing a verification measurement, the combustion engine being operated at a (specified) first operating point, so that an exhaust gas having at least
an increased/raised concentration of oxygen or
an increased/raised first temperature;
is provided upstream of the particle filter
when an increase in a second temperature is ascertained during or subsequently to step b) downstream of the particle filter, the following step being implemented:

c) initiating a second regeneration of the particle filter.

The method is introduced in response to an already initiated first regeneration of a particle filter. The first regeneration is accomplished by increasing the exhaust-gas temperature and/or by providing additional oxygen in the exhaust gas upstream of the particle filter. The exhaust-gas temperature or the concentration of oxygen in the exhaust gas may be increased by a combustion engine measure. The increase in the exhaust-gas temperature, respectively in the concentration of oxygen relates to the exhaust-gas temperature, respectively to the concentration of oxygen that would be preset by an operating point of the combustion engine, otherwise preset by a driver, for example. Thus, for the motor vehicle, the (customary) exhaust-gas temperature and/or the (usual) concentration of oxygen in the exhaust gas may be specified, respectively set (characteristics map) at specific operating points of a combustion engine, and an increased value, which deviates therefrom, may be set upon implementation of the method provided here. In step b), (combustion engine) processes may be initiated to convert the particles possibly still present in the particle filter to the extent that an increase in the second temperature is expected.

The first regeneration is initiated, in particular as the result of a modeling, thus especially not on the basis of specific measurements in the exhaust-gas stream. Here in particular, the need is eliminated for the otherwise usual outlay for equipment (for example, a measurement of the pressure drop across the particle filter to determine the particle loading). It is thus preferable that no pressure sensor be configured immediately (respectively adjacently) upstream, respectively downstream of the particle filter.

The modeling takes into consideration the course of an operation of the combustion engine, allowing, in particular for driving environment conditions.

A first regeneration is performed in step a) until a particle loading of the particle filter (computationally) reaches a (predetermined) lower limit value. The first regeneration is initiated when it is established, for example, on the basis of a modeling (for example, on the basis of an analysis of the handling characteristics and/or an analysis of the operation of the combustion engine) that the particle loading of the particle filter has reached an upper limit value.

The result of the particle loading of the particle filter is that an exothermic conversion of the particles may commence at certain operating points of the combustion engine, thus also in the normal operation thereof and not during a deliberately initiated regeneration. Depending on the operating points at which the combustion engine is operated from this point in time on, respectively on the magnitude of the particle loading, also the extent to which it locally varies, the particle filter may be (locally) damaged by the exothermic conversion of the particles. For this reason, the combustion engine is only still operated at certain operating points, respectively an operation at certain operating points is prevented in response to a specific loading of the particle filter, for example, upon reaching the lower (or also the upper) limit value.

The lower limit value describes, in particular a maximum quantity of particles in the particle filter (for example, with regard to the number of particles and/or the mass thereof), which may be located in the particle filter following a (first regeneration); in the case of this maximum quantity, there is still no need for limiting the operation of the combustion engine. However, should the loading of the particle filter exceed the lower limit value; at certain operating points of the combustion engine (upon reaching particularly high temperatures, or in especially lean operation—and the provision of a high oxygen excess upstream of the particle filter in accordance therewith), an exothermic reaction of this quantity of particles could occur, which may damage the particle filter.

In step b), what is generally referred to as a verification measurement follows, where the combustion engine is operated (at least for a short period) at a specified, first operating point (defined, in particular by the actual torque or actual rotational speed—engine characteristics map). At this operating point, an oxygen excess is provided (for example, by combustion engine operation) in the exhaust gas, and/or an exhaust gas having an increased first temperature is provided upstream of the particle filter; this measure exothermically converts particles that are possibly still stored in the particle filter. The thus induced conversion of the particles results in an increase in the second temperature of the exhaust gas downstream of the particle filter, which may be recorded by a temperature sensor.

The "first" temperature is the temperature of the exhaust gas upstream of the particle filter, while the "second" temperature is the temperature of the exhaust gas downstream thereof. Within the scope of the method, it is possible to analyze a change in the second temperature downstream of the particle filter in response to a modified first temperature or an increase in the oxygen concentration in the exhaust gas upstream of the particle filter.

In step b), the concentration of oxygen in the exhaust gas is increased in particular by at least 10%, preferably by at least 20% in comparison to a (regeneration or second) operating point existing immediately before step b).

Alternatively or additionally, in step b), the first temperature of the exhaust gas is increased in particular by at least 5%, preferably by at least 10% in comparison to a (regeneration or second) operating point existing immediately before step b).

When the verification measurement does not measure any (significant) increase in the second temperature in the exhaust gas, it may be inferred that the first regeneration in accordance with step a) was sufficient. In particular, it may be inferred that the modeling of the loading of the particle filter and/or of the modeling of the first regeneration were/ was accurate enough.

If an increase in the second temperature in the exhaust gas is established, it may be inferred that, in spite of the first regeneration, the particle filter continues to be substantially loaded with particles. In such a case, the particle filter could be damaged by the operation of the combustion engine at certain operating points. For this reason, a second regeneration of the particle filter is (immediately) initiated at this stage to further reduce the particle loading of the just regenerated particle filter.

Specifically, following step c), the method is subsequently continued in step b). The method may be performed repeatedly as long as, respectively as often as required until it is established after step b) that there is no longer an increase in the second temperature.

In step b), the combustion engine is preferably operated at the first operating point without fuel injection. Thus, this first operating point refers to what it commonly known as an overrun phase, during which the combustion engine is driven by the movement of the motor vehicle, thus kept in rotation.

Between steps a) and b), the combustion engine may be operated at a second operating point that is freely selectable by a user; step b) being initiated at a time interval after the end of the first regeneration in accordance with step a).

The time interval is at least one (1) second, preferably at most five (5) seconds.

The first regeneration in accordance with step a) is initiated exclusively on the basis of a computation model (thus, by modeling) and, for example, performed using combustion engine measures. In particular, no measurement results are ascertained from the exhaust-gas pipe nor used for initiating, monitoring and/or adapting the first regeneration.

In particular, the combustion engine is operated at least during steps a) and c) in a way that limits the concentration of oxygen in the exhaust gas and/or the first temperature of the exhaust gas (immediately) upstream of the particle filter. It is intended, in particular, that the limitation ensure that a thermal overloading of and thus damage to the particle filter not occur. It is intended that the (first/second) regeneration be accomplished as completely as possible, so that a (predetermined) lower limit value is reached at any rate with respect to the particle loading.

In accordance with another preferred embodiment, at least one temperature sensor for measuring a second temperature of the exhaust gas is configured (immediately) downstream of the particle filter (or at the downstream end thereof), the combustion engine being operated at least during step b) in such a way that, upstream of the particle filter, at least an increased/raised concentration of oxygen in the exhaust gas or
    a first temperature of the exhaust gas is set as a function of the measured second temperature.

During modification of the increased concentration of oxygen and/or increasing of the first temperature of the exhaust gas upstream of the particle filter, the second temperature is ascertained downstream of the particle filter. Potential damage to the particle filter, which may be expected due to a measured, sharp increase in the second temperature, may be prevented by the first temperature, respectively the concentration of oxygen in the exhaust gas upstream of the particle filter again being lowered in such a situation.

The first and/or second regeneration are/is performed, in particular at a (possibly mutually different) specific regeneration operating point of the combustion engine. This regeneration operating point is implemented, in particular exclusively during the regeneration (and possibly during the verification measurement).

A motor vehicle is also provided, including at least a combustion engine and an exhaust system; a particle filter and, downstream thereof, at least a temperature sensor for measuring a second temperature of the exhaust gas being configured in the exhaust system; the motor vehicle having a control unit for operating the combustion engine; the control unit being suited for implementing the method provided here, so that, upstream of the particle filter, at least an increased concentration of oxygen in the exhaust gas or a first temperature of the exhaust gas being settable by the control unit as a function of the measured second temperature.

The explanations regarding the method may be applied to the motor vehicle and vice versa.

BRIEF DESCRIPTION OF THE DRAWINGS

The present invention, as well as the technical field are explained in greater detail in the following with reference to the figures. The figures show especially preferred exemplary embodiments; however, the present invention is not limited thereto. It should be noted in particular that the figures and, in particular the illustrated relative sizes are only schematic. The same reference numerals denote functionally equivalent subject matters.

DETAILED DESCRIPTION OF THE INVENTION

Figure 1:
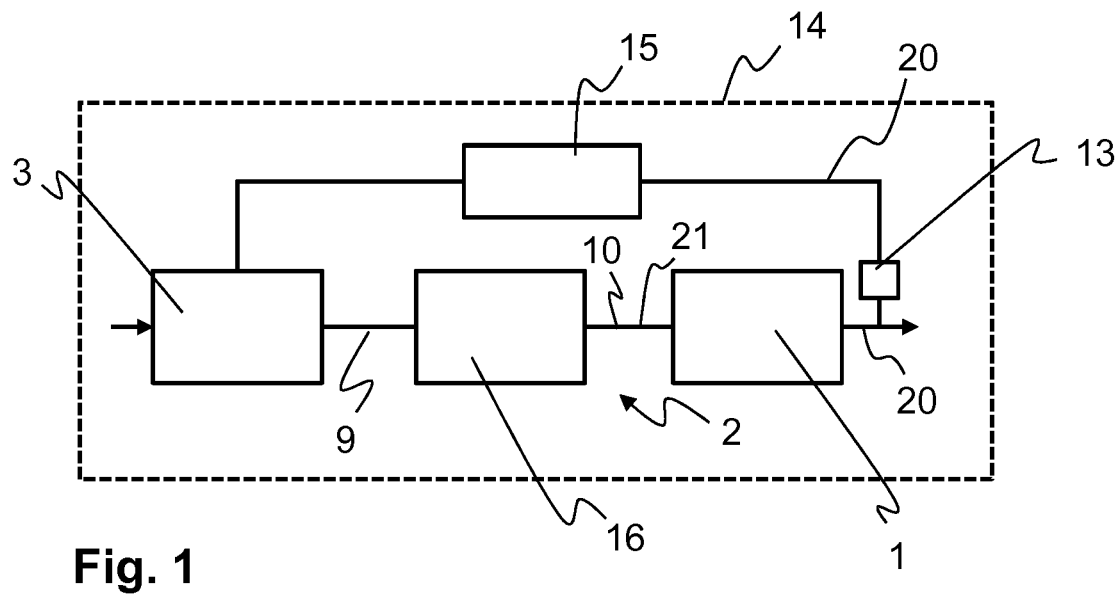
FIG. 1 shows a motor vehicle having an exhaust system.

FIG. 1 shows a motor vehicle 14 having an exhaust system 2. Motor vehicle 14 includes a combustion engine 3 and an exhaust system 2; configured in exhaust system 2 along the direction of flow of exhaust gas 9, there initially being a catalytic converter 16, followed by a particle filter 1 and, downstream thereof, a temperature sensor 13 for measuring a second temperature 20 of exhaust gas 9. Motor vehicle 14 has a control unit 15 for operating combustion engine 3; as a function of first temperature 10 measured downstream of particle filter 1, control unit 15 setting an increased concentration of oxygen 21 in exhaust gas 21 and/or providing an exhaust gas 9 having an increased first temperature 10 upstream of particle filter 1. Control unit 15 also models the first and second regeneration of particle filter 1; combustion engine 3 then being operated at certain, corresponding operating points.

Figure 2:
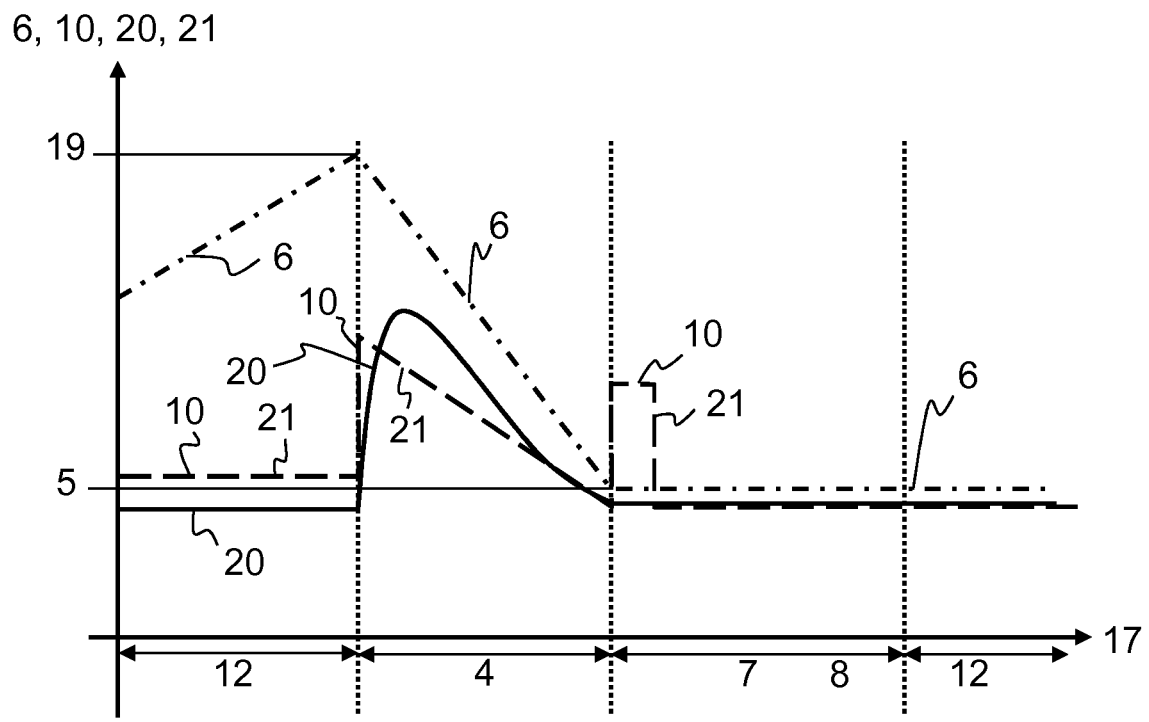
FIG. 2: shows a first temperature/oxygen/particle loading/time diagram.

FIG. 2 shows a first diagram, illustrating an exemplary profile of the temperature, oxygen, and particle loading over time. First temperature 10, second temperature 20, oxygen 21, and particle loading 6 of particle filter 1 are plotted on the vertical axis. Time 17 is plotted on the horizontal axis.

Figure 3:
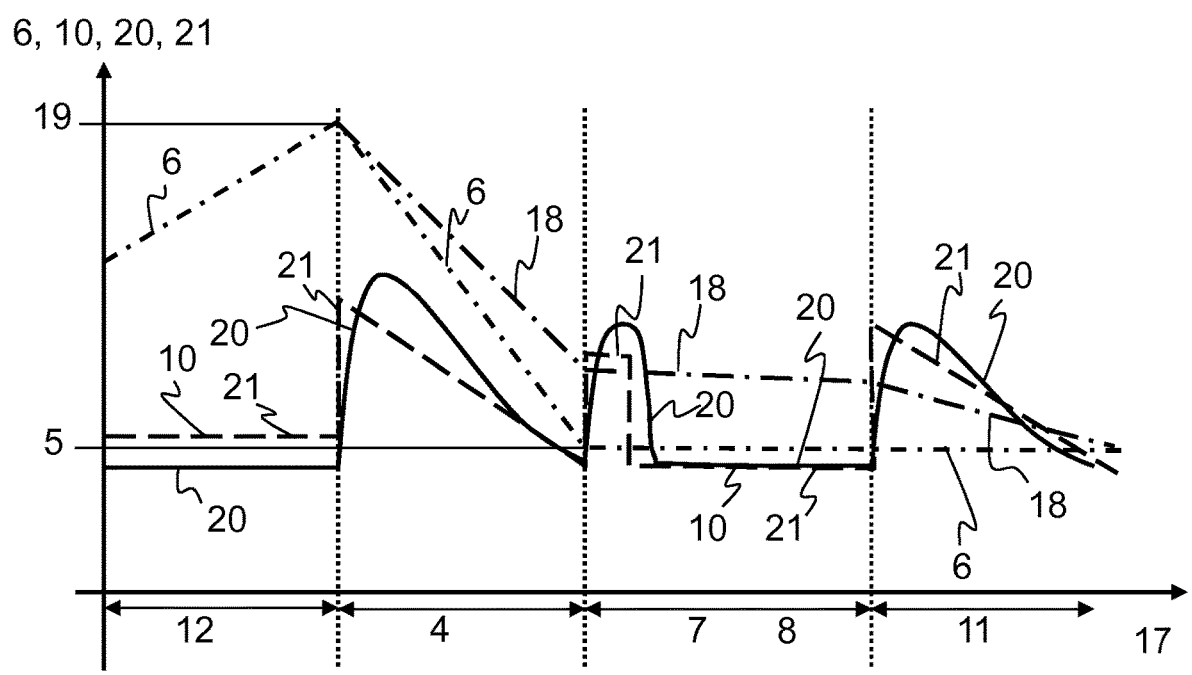
FIG. 3: shows a second temperature/oxygen/particle loading/time diagram.

At a zero point in time illustrated here (origin of the depicted diagram), a particle loading 6 increases with time 17. During this time 17, combustion engine 3 is operated at a second operating point 12 (selectable to possibly already be restricted); second temperature 20 of exhaust gas 9 being essentially constant here downstream of particle filter 1. A first regeneration 4 of particle filter 1 is initiated upon reaching an upper limit value 19. First regeneration 4 is accomplished by increasing first temperature 10 of exhaust gas 9 and/or by providing additional oxygen 21 in exhaust gas 9 upstream of particle filter 1 (by engine operation and/or via an inlet in the exhaust system). The profile of first temperature 10 and the concentration of oxygen 21 in exhaust gas 9 are shown in FIGS. 2 and 3, in each case on a common curve.

In step a) of the method, a first regeneration 4 is performed until a particle loading 6 of particle filter 1 (computationally) reaches a lower limit value 5. Lower limit value 5 describes an upper limit of a particle loading 6 that may be placed in particle filter 1 following first regeneration 4.

A verification measurement 7 follows in step b), during which combustion engine 3 is operated for a brief time 17 at a specific, first operating point 8. At this first operating point 8, a significantly increased quantity of oxygen 21 is provided in exhaust gas 9 upstream of particle filter 1 that would exothermically convert particles possibly still stored in particle filter 1. The thus induced conversion of the particles would result in an increase in second temperature 20 of exhaust gas 9 downstream of particle filter 1, which may be recorded by a temperature sensor 13.

Here, no (significant) increase in second temperature 20 in exhaust gas 9 is measured as a result of verification measurement 7. It may, therefore, be inferred that first regeneration 4 in accordance with step a) was sufficient. In particular, it is inferred that the modeling of particle loading 6 of particle filter 1 and/or of first regeneration 4 was accurate enough.

Following verification measurement 7, combustion engine 3 is operated at any second operating point 12.

FIG. 3 shows exemplarily a second diagram having deviating profiles. In contrast to FIG. 2, verification measurement 7 establishes an increase in second temperature 20 in exhaust gas 9. It is thus inferred that, in spite of first regeneration 4, particle filter 1 continues to be loaded with particles. Thus, actually present, real particle loading 18 is greater than (modeled, thus computationally determined) particle loading 6. Therefore, in a step c) of the method, a second regeneration 11 of particle filter 1 is initiated, further reducing particle loading 6 of particle filter 1.

Second regeneration 11 is essentially performed along the lines of first regeneration 4. Thus, at least for a short period, a first temperature 10 of exhaust gas 9 or a concentration of oxygen 21 is increased upstream of particle filter 1, thereby reducing particle loading 6 of particle filter 1.

REFERENCE NUMERAL LIST 1 particle filter
2 exhaust system
3 combustion engine
4 first regeneration
5 lower limit value
6 particle loading
7 verification measurement
8 first operating point
9 exhaust gas
10 first temperature
11 second regeneration
12 second operating point
13 temperature sensor
14 motor vehicle
15 control unit
16 catalytic converter
17 time
18 real particle loading
19 upper limit value
20 second temperature
21 oxygen

What is claimed is:

1. A method for regenerating a particle filter, which is located in an exhaust system of an internal combustion engine, comprising at least the following steps:
   a) performing a first regeneration of the particle filter until a lower limit value of a particle loading of the particle filter is reached;
   b) operating the combustion engine at a first operating point that is freely selectable by a user;
   c) performing a verification measurement, the combustion engine being operated at a second operating point, so that an exhaust gas having at least
   an oxygen excess or
   an increased first temperature
is provided upstream of the particle filter;
   wherein step c) is initiated at a time interval after the end of the first regeneration in accordance with step a); and
   when an increase in a second temperature of the exhaust gas is ascertained during or after step c) downstream of the particle filter, the following step being performed:
   d) initiating a second regeneration of the particle filter.

2. The method as recited in claim 1, wherein, in step c), the combustion engine is operated at the second operating point without fuel injection.

3. The method as recited in claim 1, wherein the time interval is at least one second.

4. The method as recited in claim 1, wherein the time interval is at most five seconds.

5. The method as recited in claim 1, wherein the first regeneration in accordance with step a) is performed exclusively on the basis of a computation model.

6. The method as recited in claim 1, wherein, at least during steps a) and d), the combustion engine is operated in a way that at least limits
   the oxygen excess in the exhaust gas or
   a first temperature of the exhaust gas
upstream of the particle filter.

7. The method as recited in claim 1, wherein:
   at least one temperature sensor for measuring a second temperature of the exhaust gas is configured downstream of the particle filter; and
   the combustion engine is operated at least during step c) in such a way that, upstream of the particle filter, the at least an oxygen excess in the exhaust gas or the first temperature increase of the exhaust gas is set as a function of the measured second temperature.

8. A motor vehicle comprising
   a combustion engine;
   an exhaust system,
   a particle filter,
   downstream of the particle filter, at least a temperature sensor in the exhaust system;
   a control unit for operating the combustion engine, the control unit being suited for implementing the method according to claim 1, so that, upstream of the particle filter, at least
   an oxygen excess in the exhaust gas or
   a first temperature of the exhaust gas
is settable by the control unit as a function of the measured second temperature.

* * * * *